United States Patent
Hirano et al.

(10) Patent No.: US 10,576,802 B2
(45) Date of Patent: Mar. 3, 2020

(54) SUSPENSION ARM FOR A VEHICLE

(71) Applicants: TOYOTA JIDOSHA KABUSHIKI KAISHA, Toyota-shi, Aichi-ken (JP); MITSUBISHI CHEMICAL CORPORATION, Tokyo (JP)

(72) Inventors: Takashi Hirano, Nisshin (JP); Yasuhiko Nabeshima, Toyohashi (JP)

(73) Assignees: TOYOTA JIDOSHA KABUSHIKI KAISHA, Toyota-shi, Aichi-ken (JP); MITSUBISHI CHEMICAL CORPORATION, Tokyo (JP)

( * ) Notice: Subject to any disclaimer, the term of this patent is extended or adjusted under 35 U.S.C. 154(b) by 167 days.

(21) Appl. No.: 15/941,292

(22) Filed: Mar. 30, 2018

(65) Prior Publication Data

US 2018/0290512 A1 Oct. 11, 2018

(30) Foreign Application Priority Data

Apr. 10, 2017 (JP) .................................. 2017-077285

(51) Int. Cl.
*B60G 7/00* (2006.01)

(52) U.S. Cl.
CPC .......... *B60G 7/001* (2013.01); *B60G 2206/10* (2013.01); *B60G 2206/11* (2013.01); *B60G 2206/7101* (2013.01)

(58) Field of Classification Search
CPC ............ B60G 2206/7101; B60G 7/001; B60G 2206/10
See application file for complete search history.

(56) References Cited

U.S. PATENT DOCUMENTS

| 2014/0127521 A1* | 5/2014 | Ishibashi | B29C 70/345 |
| | | | 428/474.7 |
| 2017/0210418 A1* | 7/2017 | Sakuma | B62D 7/18 |
| 2019/0283805 A1* | 9/2019 | Kurokawa | B62D 29/048 |

FOREIGN PATENT DOCUMENTS

| DE | 10 2013 007 284 A1 | 10/2014 |
| JP | 01-62905 U | 4/1989 |
| JP | 2011-126075 A | 6/2011 |
| JP | 2012196186 A * | 10/2012 |

* cited by examiner

*Primary Examiner* — Karen Beck
(74) *Attorney, Agent, or Firm* — Sughrue Mion, PLLC

(57) ABSTRACT

A suspension arm includes an arm portion and coupling portions, and the suspension arm is integrally made of a fiber reinforced plastics in entirety. The entire arm portion is made of a random fiber reinforced plastics. Each of the coupling portions is made of a continuous fiber reinforced plastics in which continuous fibers are oriented along a circumferential direction of an insertion hole over a region on a distal end side of the suspension arm, which continuously extends by at least a half circumference around a center axis of the insertion hole, the region including a position crossing a flat plane that is orthogonal to a straight line connecting center points of the insertion holes of elastic bushes and passes through the center point of the insertion hole.

5 Claims, 6 Drawing Sheets

SUSPENSION ARM FOR A VEHICLE

BACKGROUND OF THE INVENTION

1. Field of the Invention

The present invention relates to a suspension arm to be used in a suspension configured to suspend a wheel on a vehicle body.

2. Description of the Related Art

A suspension arm for a vehicle is a member configured to couple a vehicle body member and a wheel support member to each other through intermediation of coupling members. For example, the suspension arm includes an arm portion and annular coupling portions formed at both ends of the arm portion. Each of the coupling portions has an insertion hole in which an elastic bush or a ball joint is inserted. One of the coupling portions is coupled to a suspension member that is the vehicle body member, and the other of the coupling portions is coupled to a carrier that is the wheel support member.

In recent years, there has also been known a suspension arm made of a fiber reinforced plastics instead of a metal (iron or aluminum) that has hitherto been used in order to achieve reduction in weight.

For example, according to a suspension arm proposed in German Patent Application Publication No. 102013007284, the suspension arm, in its entirety, is made of a continuous fiber reinforced plastics in which continuous fibers are impregnated with a resin.

The suspension arm is arranged between the vehicle body member and the wheel support member, and hence a tensile load and a compressive load are applied mainly in an axial direction of the arm portion. The continuous fiber reinforced plastics has high strength with respect to (against) the tensile load in a direction of the continuous fibers, but has low strength with respect to (against) the compressive load that is applied in a direction opposite to that of the tensile load. In the suspension arm proposed in German Patent Application Publication No. 102013007284, the continuous fibers of the arm portion are oriented in the same direction as the axial direction of the arm portion. Therefore, this suspension arm is strong with respect to the tensile load applied to the arm portion, but is weak with respect to the compressive load applied to the arm portion.

In view of the foregoing, consideration is made of a configuration in which the suspension arm, in its entirety, is made of a random fiber reinforced plastics in which discontinuous fibers are randomly oriented as reinforcing fibers. The random fiber reinforced plastics has high strength with respect to the compressive load, but has low strength with respect to the tensile load. As illustrated in FIG. 4, in the suspension arm, a largest tensile load is applied to portions W in coupling portions Y arranged at both ends of an arm portion X. When the suspension arm is made of the random fiber reinforced plastics, the portions W become weakest portions having lowest strength with respect to the tensile load, and hence required durability cannot be satisfied. In FIG. 4, there are illustrated an elastic bush Z and an insertion hole U in which the elastic bush Z is inserted.

SUMMARY OF THE INVENTION

The present invention has been made to solve the above-mentioned problem, and has an object to provide a suspension arm that satisfies required strength and is reduced in weight.

According to one embodiment of the present invention, there is provided a suspension arm for a vehicle, including: an arm portion (10) formed into a solid bar shape; and two coupling portions (20*a*, 20*b*) each having an annular shape, the two coupling portions (20*a*, 20*b*) being arranged at both ends of the arm portion and each having an insertion hole (21) in which a coupling member (50) to be coupled to one of a vehicle body member and a wheel support member is inserted, the suspension arm being integrally made of a fiber reinforced plastics in entirety, the fiber reinforced plastics including a continuous fiber reinforced plastics (A) in which continuous fibers adhere to each other with a resin and a random fiber reinforced plastics (B) in which discontinuous fibers adhere to each other with a resin in random orientations, the arm portion being made of the random fiber reinforced plastics, the two coupling portions each being made of the continuous fiber reinforced plastics in which the continuous fibers are oriented along a circumferential direction of the insertion hole over a region on a distal end side of the suspension arm, which continuously extends by at least a half circumference around a center axis (L2) of the insertion hole, the region including a position (X) crossing a flat plane (Fa, Fb) that is orthogonal to a straight line (L1) connecting center points (Oa, Ob) of the insertion holes and passes through the center point of the insertion hole.

The suspension arm for a vehicle according to the present invention includes the arm portion formed into a solid bar shape and the two coupling portions arranged at both ends of the arm portion, and the suspension arm is integrally made of the fiber reinforced plastics in entirety. The coupling portion has the insertion hole in which the coupling member to be coupled to a vehicle body member or a wheel support member is inserted. The coupling member is, for example, an elastic bush or a ball joint.

The fiber reinforced plastics includes the continuous fiber reinforced plastics in which the continuous fibers adhere to each other with a resin (resin containing the continuous fibers as reinforcing fibers) and the random fiber reinforced plastics in which the discontinuous fibers adhere to each other with a resin in random orientations (resin containing the randomly oriented discontinuous fibers as reinforcing fibers), and the continuous fiber reinforced plastics and the random fiber reinforced plastics are appropriately selected depending on the portion of the suspension arm.

The arm portion is made of the random fiber reinforced plastics. Therefore, even when both the tensile load and the compressive load are applied to the arm portion, the arm portion can maintain the required strength. Meanwhile, the two coupling portions are each made of the continuous fiber reinforced plastics in which the continuous fibers are oriented along the circumferential direction of the insertion hole over the region on the distal end side of the suspension arm, which continuously extends by at least a half circumference around the center axis of the insertion hole, the region including the position crossing the flat plane that is orthogonal to the straight line connecting the center points of the insertion holes and passes through the center point of the insertion hole. Thus, a weakest portion having lowest strength with respect to (against) the tensile load is made of the continuous fiber reinforced plastics, and hence the required strength can be maintained also in the weakest portion.

In this case, in the continuous fiber reinforced plastics in which the continuous fibers are oriented so as to be aligned in one direction, it is preferred that the continuous fibers be arranged along a circumferential direction of the insertion hole so as to be parallel to a flat plane that is orthogonal to the center axis of the insertion hole. Further, in the continuous fiber reinforced plastics in which the continuous fibers are woven into a fabric state, it is only necessary that the continuous fibers be arranged along the circumferential direction of the insertion hole in plan view as seen from the direction of the center axis of the insertion hole.

According to one embodiment of the present invention, at least one of the two coupling portions includes the region (R1, R2) made of the continuous fiber reinforced plastics, the region (R1, R2) being formed into an arc shape around the center axis of the insertion hole, and a region on the arm portion side with respect to the region (R1, R2) formed into the arc shape, the region on the arm portion side being made of the random fiber reinforced plastics.

According to one embodiment of the present invention, in at least one of the coupling portions, the continuous fiber reinforced plastics is formed into an arc shape around the center axis of the insertion hole, and the region on the arm portion side with respect to the region of the continuous fiber reinforced plastics formed into the arc shape is made of the random fiber reinforced plastics. The cost of the continuous fiber reinforced plastics is higher than that of the random fiber reinforced plastics. Thus, according to one embodiment of the present invention, the required strength can be maintained with respect to the tensile load at low cost.

According to one embodiment of the present invention, at least one of the two coupling portions includes the region (R3) made of the continuous fiber reinforced plastics, the region being formed into an annular shape making a round of the center axis of the insertion hole.

According to one embodiment of the present invention, in at least one of the coupling portions, the region made of the continuous fiber reinforced plastics is formed into an annular shape making a round of the center axis of the insertion hole. Thus, a joint surface on which the continuous fiber reinforced plastics and the random fiber reinforced plastics are joined to each other is not formed in the circumferential direction around the center axis of the insertion hole, and hence durability can be improved. Further, moldability can be improved.

According to one embodiment of the present invention, the at least one of the two coupling portions is made of the continuous fiber reinforced plastics in a part of a thickness in a radial direction and is made of the random fiber reinforced plastics in a remaining part of the thickness in the radial direction.

According to one embodiment of the present invention, in at least one of the coupling portions, the part of the thickness in the radial direction (radial direction of the insertion hole) is made of the continuous fiber reinforced plastics. Further, the remaining part of the thickness in the radial direction is made of the random fiber reinforced plastics. Thus, through setting of the thickness of the continuous fiber reinforced plastics in accordance with the required strength, the required strength can be maintained with respect to the tensile load at low cost.

According to one embodiment of the present invention, the continuous fibers and the discontinuous fibers comprise carbon fibers.

According to one embodiment of the present invention, high mechanical characteristics are obtained.

For facilitating the understanding of the invention, in the above description, the configurations of the invention corresponding to the embodiment are suffixed in parentheses with symbols used in the embodiment. However, the components of the invention are not intended to be limited to the embodiment as defined by the symbols.

DESCRIPTION OF THE EMBODIMENTS

Now, a suspension arm for a vehicle according to an embodiment of the present invention is described with reference to the drawings. The suspension arm for a vehicle is illustrated as the embodiment in FIG. 1.

A suspension arm 1 is a member configured to couple a vehicle body member and a wheel support member to each other through intermediation of coupling members. The suspension arm 1 is integrally formed of an arm portion 10 and two coupling portions 20a and 20b formed at both ends of the arm portion 10. The two coupling portions 20a and 20b have a common basic configuration, and hence are hereinafter referred to as "coupling portion 20" unless distinction is otherwise required.

The arm portion 10 is a solid bar-shaped body and is formed into a quadrangular prism shape with corners being rounded in this embodiment. The arm portion 10 of this embodiment is formed into a curved bar shape in order to avoid interference with other components, but may be formed into a linear bar shape.

Figure 1:
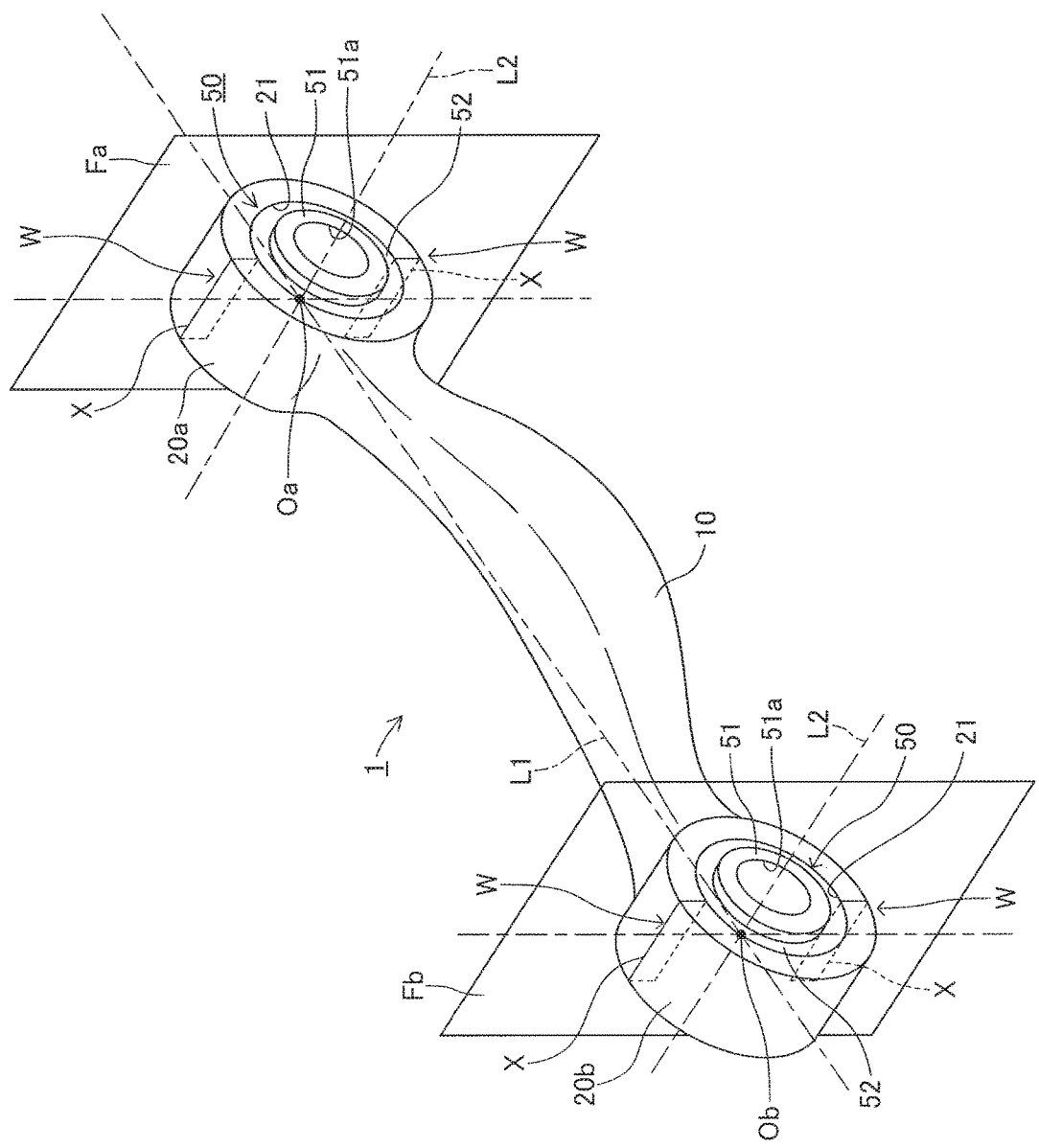
FIG. 1 is a perspective view of a suspension arm according to an embodiment of the present invention.

The coupling portions 20 are each an annular body. One coupling portion 20 (20a) is coupled to a vehicle body member (for example, a suspension member), and the other coupling portion 20 (20b) is coupled to a wheel support member (for example, a carrier). Each of the coupling portions 20 has an insertion hole 21 in which an elastic bush or a ball joint that is a coupling member is inserted and fixed. The suspension arm 1 illustrated in FIG. 1 is in a state in which an elastic bush 50 is mounted in the insertion hole 21. The elastic bush 50 has a cylindrical rubber elastic body 52 firmly fixed to an outer periphery of a metallic cylindrical tube 51.

The one coupling portion 20 (20a) is coupled to the vehicle body member by inserting a fastening bolt (not shown) in the cylindrical tube 51, and the other coupling portion 20 (20b) is coupled to the wheel support member by inserting a fastening bolt (not shown) in the cylindrical tube 51.

A related-art suspension arm is made of a metal (iron or aluminum). However, for the purpose of reduction in weight, the suspension arm 1 according to this embodiment is integrally made of carbon fiber reinforced plastics (CFRP)

in which carbon fibers serving as reinforcing fibers adhere to each other with a resin. The suspension arm 1 is formed through use of two kinds of carbon fiber reinforced plastics containing different forms of carbon fibers. One of the carbon fiber reinforced plastics is a continuous fiber reinforced plastics A in which carbon fibers formed of continuous fibers adhere to each other with a resin (resin containing, as reinforcing fibers, the carbon fibers formed of continuous fibers), and the other is a random fiber reinforced plastics B in which carbon fibers formed of discontinuous fibers, which are oriented in a random direction, adhere to each other with a resin (resin containing, as reinforcing fibers, the carbon fibers formed of randomly oriented discontinuous fibers).

As the continuous fiber reinforced plastics A, there are known a continuous fiber reinforced plastics in which continuous fibers aligned in one direction are impregnated with a resin, and a continuous fiber reinforced plastics in which continuous fibers woven into a fabric state are impregnated with a resin. Any one of those continuous fiber reinforced plastics may be used. In this embodiment, as the continuous fiber reinforced plastics A, unidirectional carbon fiber reinforced plastics in which continuous fibers aligned in one direction adhere to each other with a resin are used. Further, the carbon fibers used in the random fiber reinforced plastics B in this embodiment are cut to a length of up to about 25 mm.

As matrices (base materials) in the continuous fiber reinforced plastics A and the random fiber reinforced plastics B, materials having common heat characteristics are used. The materials may be a thermoplastic resin (for example, polyamide resin (PA6, PA66) and polypropylene resin) or a thermosetting resin (for example, epoxy resin). When the suspension arm 1 is produced by a sheet molding compound (SMC) manufacturing method, the thermosetting resin is used. When the suspension arm 1 is produced by injection molding, the thermoplastic resin is used.

The suspension arm 1 is arranged between the vehicle body member and the wheel support member. Therefore, a tensile load and a compressive load are applied mainly in an axial direction of the arm portion 10, that is, a direction of an axis line L1 connecting a center point Oa of the insertion hole 21 of the coupling portion 20a and a center point Ob of the insertion hole 21 of the coupling portion 20b. The center points Oa and Ob of the insertion holes 21 are common to center points of opening holes 51a of the cylindrical tubes 51 of the elastic bushes 50.

In a product made of the carbon fiber reinforced plastics (CFRP), a difference is caused between the strength with respect to (against) a tensile load (tensile strength) and the strength with respect to (against) a compressive load (compressive strength) depending on the arrangement state of the carbon fibers (reinforcing fibers). For example, the random fiber reinforced plastics B has low tensile strength and high compressive strength. Meanwhile, the continuous fiber reinforced plastics A has significantly high tensile strength and low compressive strength in the continuous fiber direction.

In the suspension arm 1, a load is applied mainly to the coupling portion 20 with respect to input of tension in the direction of the axis line L1. In the coupling portion 20, a portion having lowest tensile strength is a portion W (referred to as "weakest portion W") of FIG. 1. The weakest portion W is positioned in a region around a position X crossing a flat plane Fa(Fb) that is orthogonal to the axis line L1 and passes through the center point Oa(Ob) of the insertion hole 21. Meanwhile, a load is applied mainly to the entire arm portion 10 with respect to input of compression in the direction of the axis line L1.

In view of the foregoing, with respect to the arm portion 10, the random fiber reinforced plastics B is used as the fiber reinforced plastics over an entire arm length direction. That is, the entire arm portion 10 is made of the random fiber reinforced plastics B.

Meanwhile, with respect to the coupling portion 20, the continuous fiber reinforced plastics A is used over a region on a distal end side of the suspension arm 1, which continuously extends by at least a half circumference around a center axis L2 of the center point Oa(Ob) of the insertion hole 21, the region including the position X (there are two positions X opposed to each other), and the random fiber reinforced plastics B is used in a region on the arm portion 10 side with respect to the region that continuously extends by at least a half circumference. That is, the coupling portion 20 is made of the continuous fiber reinforced plastics A over the region on the distal end side of the suspension arm 1, which continuously extends by at least a half circumference around the center axis L2 of the insertion hole 21, the region including the positions X crossing the flat plane Fa(Fb) that is orthogonal to the axis line L1 connecting the center points Oa and Ob of the insertion holes 21 and passes through the center point Oa(Ob) of the insertion hole 21, and the region of the coupling portion 20 on the arm portion 10 side with respect to the region that continuously extends by at least a half circumference is made of the random fiber reinforced plastics B.

The continuous fiber reinforced plastics A contains the continuous fibers oriented along the circumferential direction of the insertion hole 21. In this case, in the continuous fiber reinforced plastics A in which the continuous fibers are oriented so as to be aligned in one direction, the continuous fibers are arranged along the circumferential direction of the insertion hole 21 so as to be parallel to a flat plane that is orthogonal to the center axis L2 of the insertion hole 21. Further, in the continuous fiber reinforced plastics A in which the continuous fibers are woven into a fabric state, it is only necessary that the continuous fibers be arranged along the circumferential direction of the insertion hole 21 in plan view as seen from the direction of the center axis L2 of the insertion hole 21.

Figure 2A:
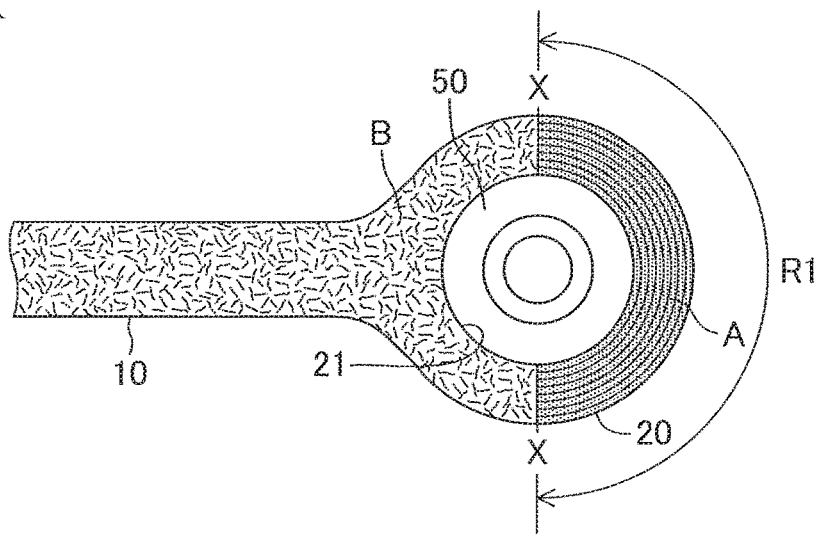
FIG. 2A, FIG. 2B, and FIG. 2C are each a sectional view for illustrating arrangement of a continuous fiber reinforced plastics A and a random fiber reinforced plastics B in a coupling portion of the suspension arm, as seen from an axis direction of the coupling portion.
Figure 2B:
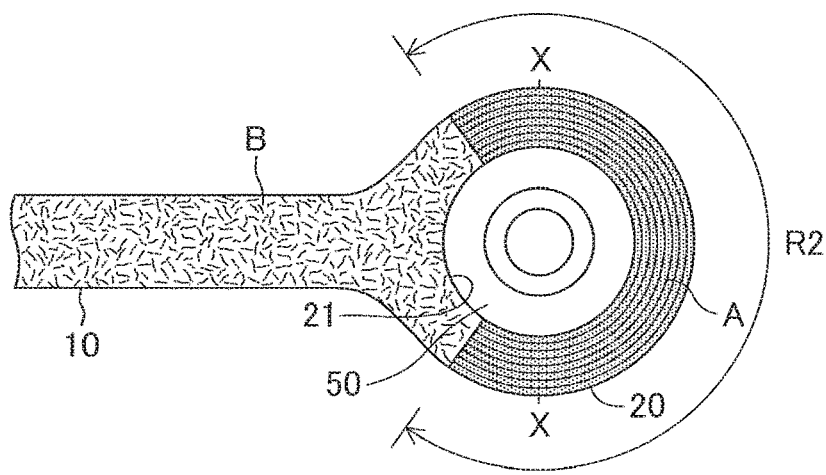

In the coupling portion 20, as illustrated in FIG. 2A, a half-circumference arc region R1 that continuously extends between the positions X may be made of the continuous fiber reinforced plastics A, and as illustrated in FIG. 2B, a C-shaped arc region R2 which is longer than the half-circumference arc region R1 in the circumferential direction may be made of the continuous fiber reinforced plastics A.

Figure 2C:
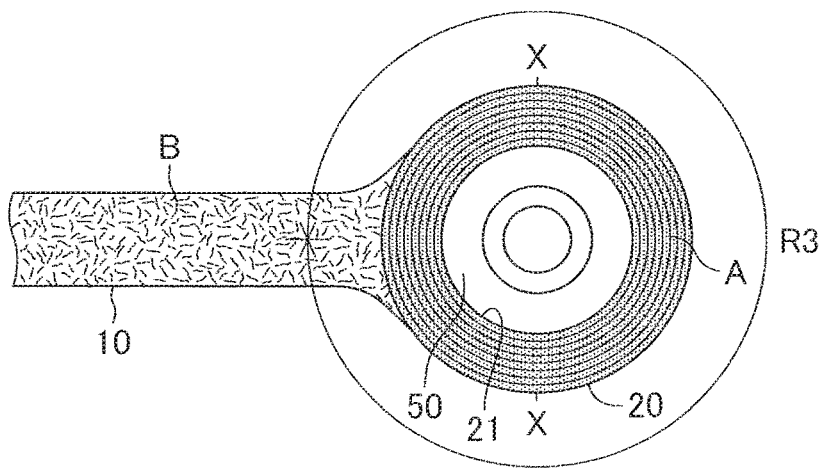

Further, in the coupling portion 20, as illustrated in FIG. 2C, an annular region R3 which is longer than the C-shaped arc region R2 in the circumferential direction may be made of the continuous fiber reinforced plastics A. The annular region R3 may extend to the arm portion 10 side up to a boundary region in which the coupling portion 20 and the arm portion 10 are connected to each other. In the boundary region, it is preferred that the continuous fiber reinforced plastics A and the random fiber reinforced plastics B be formed so as to overlap with each other in an arm width direction.

Figure 3:
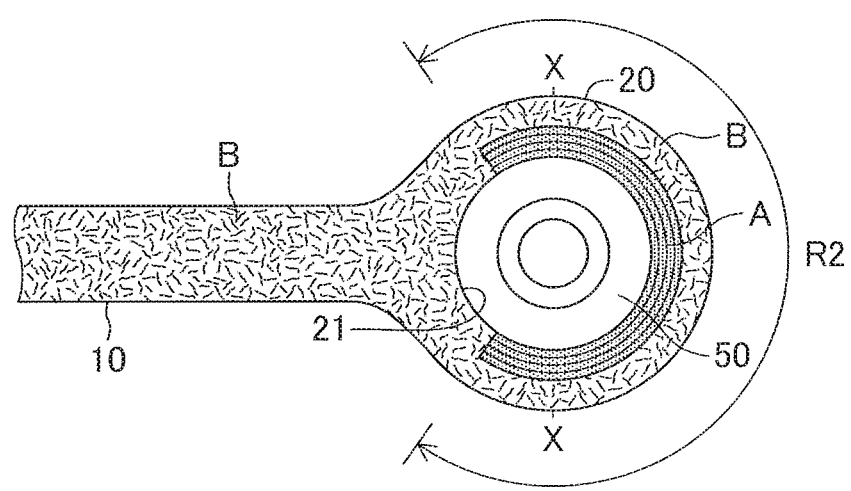
FIG. 3 is a sectional view for illustrating arrangement of the continuous fiber reinforced plastics A and the random fiber reinforced plastics B in the coupling portion of the suspension arm, as seen from the axis direction of the coupling portion.
Figure 4:
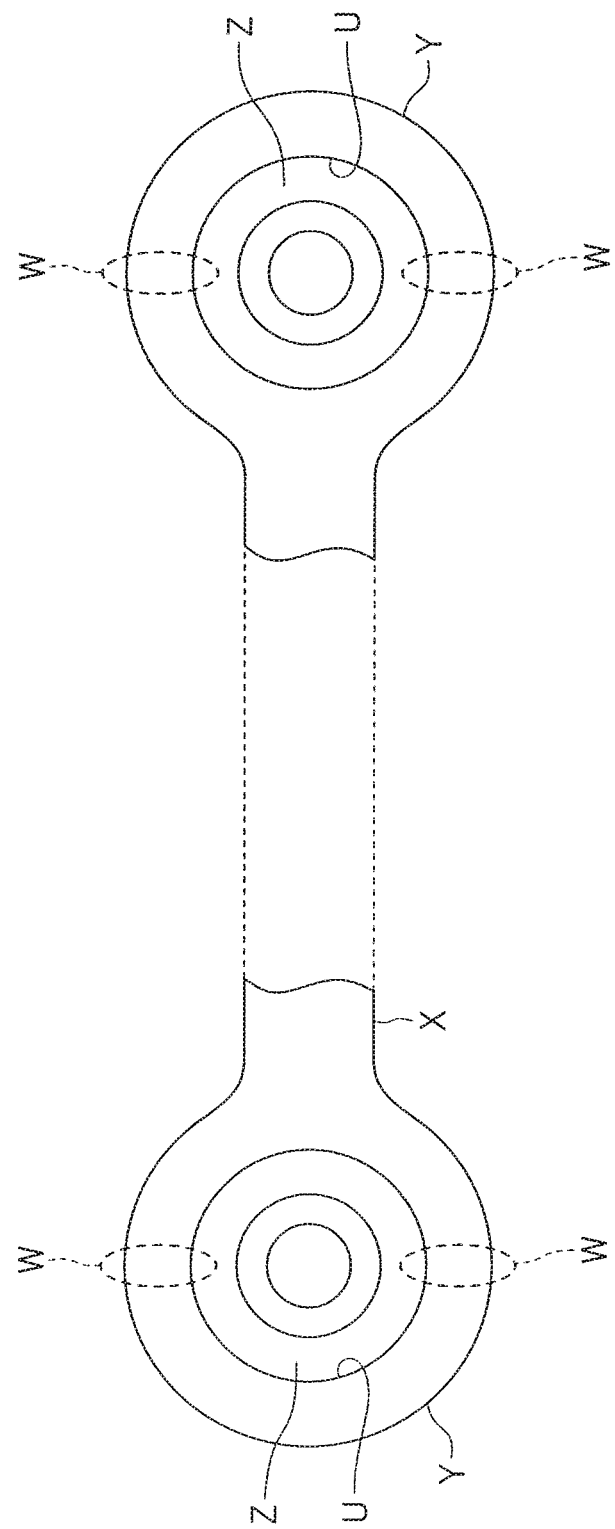
FIG. 4 is a view for illustrating weakest portions with respect to a tensile load, as seen from the axis direction of the coupling portion.

Further, as illustrated in FIG. 3, the coupling portion 20 may be made of the continuous fiber reinforced plastics A only in a part of a thickness in a radial direction (radial direction of the insertion hole 21). In this example, only a part of the C-shaped arc region R2 on a radially inner side is made of the continuous fiber reinforced plastics A, but only a part of the C-shaped arc region R2 on a radially outer side may be made of the continuous fiber reinforced plastics A. Further, only a part of the half-circumference arc region R1 on the radially inner side or on the radially outer side may be made of the continuous fiber reinforced plastics A. Further, only a part of the annular region R3 on the radially inner side or on the radially outer side may be made of the continuous fiber reinforced plastics A.

The formation regions of the continuous fiber reinforced plastics A illustrated in FIG. 2A to FIG. 2C and FIG. 3 have a common cross-section at any position of the axis direction of the coupling portion 20 (axis direction of the insertion hole 21).

Further, in the two coupling portions 20a and 20b, the regions in which the continuous fiber reinforced plastics A is formed are not required to be equal to each other, and those regions can be set independently from each other.

Figure 5:
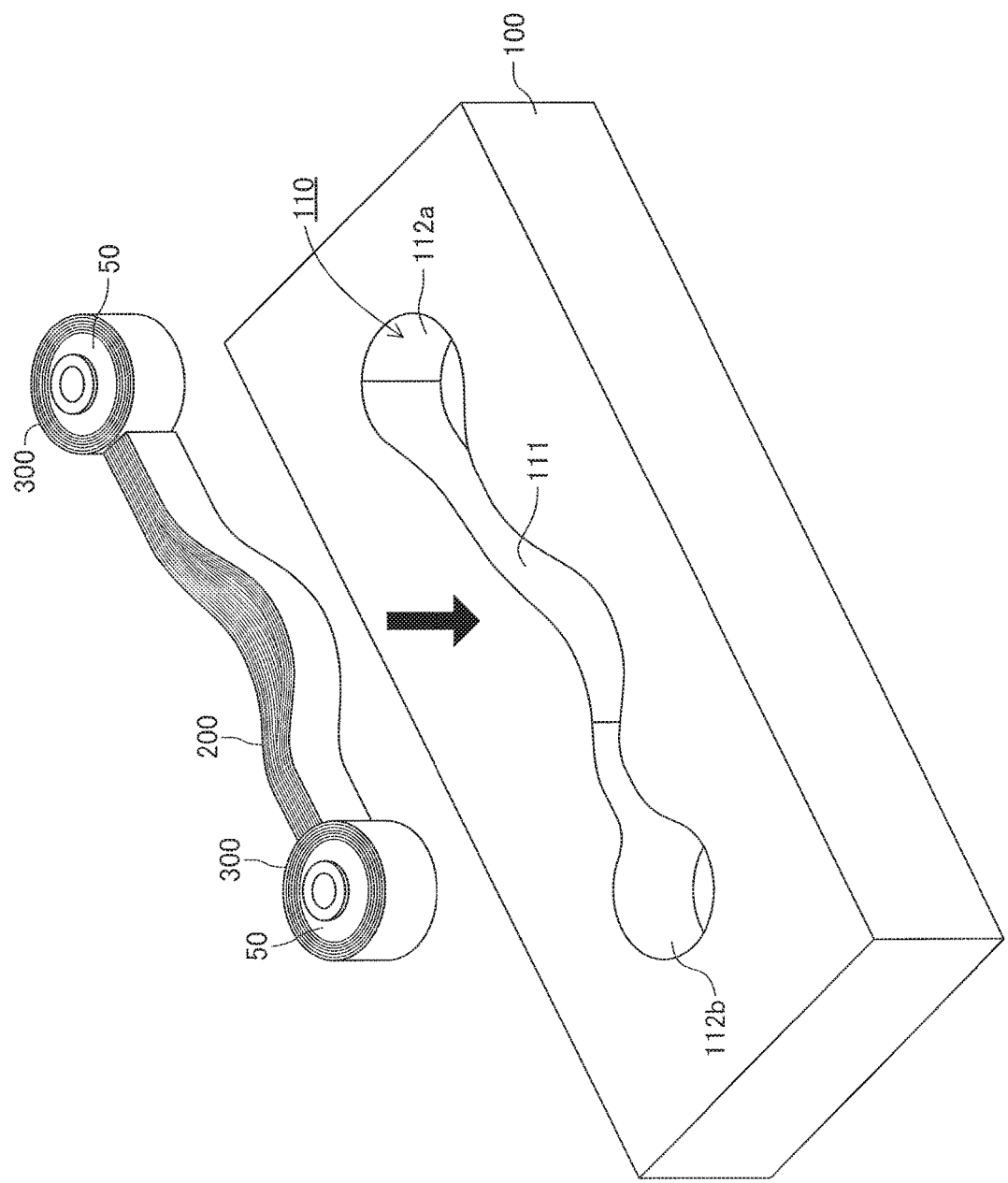
FIG. 5 is a perspective view for illustrating a method of manufacturing the suspension arm according to the embodiment.
Figure 6:
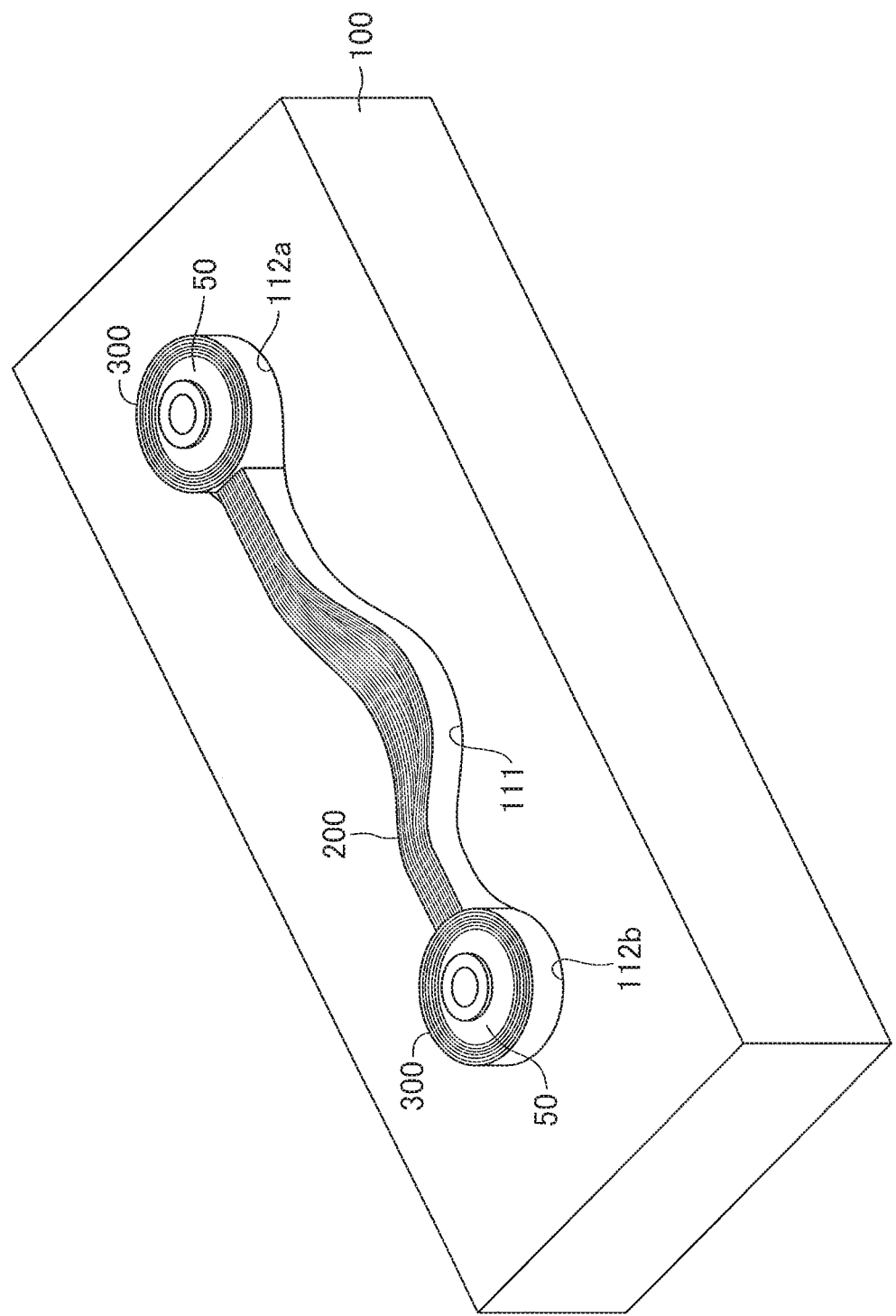
FIG. 6 is a perspective view for illustrating the method of manufacturing the suspension arm according to the embodiment.

The above-mentioned suspension arm can be manufactured in a seamless manner by, for example, the SMC manufacturing method or injection molding. FIG. 5 and FIG. 6 are each an illustration of an example of the SMC manufacturing method. The suspension arm is formed through use of sheets being base materials for obtaining random carbon fiber reinforced plastics (which is generally called SMC materials, and hence are hereinafter referred to as "SMC materials") and sheets being base materials for obtaining unidirectional continuous carbon fiber reinforced plastics (which are generally called UD prepregs, and hence are hereinafter referred to as "UD prepregs"). The term "UD" is an abbreviation of "unidirectional".

The SMC material is a sheet-shaped material in a partially cured state in which carbon fibers (for example, carbon fibers cut to a length of about 25 mm or less), which are oriented in a random direction, are mixed in a thermosetting resin. The UD prepreg is a sheet-shaped material in a partially cured state in which carbon fibers that are oriented so as to be aligned in one direction are impregnated with a thermosetting resin.

As illustrated in FIG. 5, a recessed portion 110 configured to mold a lower side (one side in the axis direction of the coupling portion) of the suspension arm 1 is formed in a lower die (metallic mold) 100. The recessed portion 110 includes an arm portion molding region 111 and coupling portion molding regions 112a and 112b. The arm portion molding region 111 is positioned at the center and is configured to mold the lower side of the arm portion 10. The coupling portion molding regions 112a and 112b are arranged on both sides of the arm portion molding region 111 continuously from the arm portion molding region 111 and are configured to mold the lower sides of the coupling portions 20.

As illustrated in FIG. 6, SMC materials 200 in an overlapping state are vertically placed in the arm portion molding region 111 so as to be parallel to a length direction of the arm portion 10. The number of overlapping SMC materials 200 and respective sheet shapes of the SMC materials 200 are determined in accordance with the shape of the arm portion 10. Further, the elastic bushes 50 each having a plurality of UD prepregs 300 wound on an outer periphery (cylindrical surface) thereof in an overlapping state are placed in the coupling portion molding regions 112a and 112b. In this case, the direction of each of the UD prepregs 300 is determined so that the continuous fibers thereof are oriented along the circumferential direction of the elastic bush 50 (oriented along the circumferential direction of the insertion hole 21 so as to be parallel to a flat plane that is orthogonal to the center axis L2 of the insertion hole 21). This example corresponds to the case in which the annular region R3 is made of the continuous fiber reinforced plastics A as illustrated in FIG. 2C, and the UD prepregs 300 are mounted so as to be wound around the entire circumference of the elastic bush 50.

After the SMC materials 200 and the elastic bushes 50 each having the UD prepregs 300 wound thereon are set in the lower die 100 as described above, an upper die (metallic mold) (not shown) (die having a recessed portion configured to mold an upper side of the suspension arm 1 in the same manner as in the lower die 100) is lowered, and the SMC materials 200 and the elastic bushes 50 are pressurized and simultaneously heated with the upper and lower dies. In this case, vacuuming is simultaneously performed.

As a result, the SMC materials 200, the UD prepregs 300, and the elastic bushes 50 are integrated in a seamless manner to mold the suspension arm 1.

Further, for example, when the half-circumference arc region R1 and the C-shaped arc region R2 are made of the continuous fiber reinforced plastics A as illustrated in FIG. 2A and FIG. 2B, the UD prepregs 300 are provisionally fixed to a circumferential region of an outer peripheral surface of the elastic bush 50, which corresponds to the half-circumference arc region R1 or the C-shaped arc region R2, and the SMC materials 200 are provisionally fixed to other circumferential region. Then, it is only necessary that the elastic bush 50 having the SMC materials 200 and the UD prepregs 300 provisionally fixed thereto be placed in each of the coupling portion molding regions 112a and 112b. Similarly, when a part of the thickness of the coupling portion 20 in the radial direction is made of the continuous fiber reinforced plastics A as illustrated in FIG. 3, the UD prepregs 300 are provisionally fixed to a portion of the elastic bush 50 in which the continuous fiber reinforced plastics A is intended to be formed, and the SMC materials 200 are provisionally fixed to other portion. Then, it is only necessary that the elastic bush 50 having the SMC materials 200 and the UD prepregs 300 provisionally fixed thereto be placed in each of the coupling portion molding regions 112a and 112b.

Further, in this embodiment, the UD prepregs 300 are used as a base material for obtaining the continuous carbon fiber reinforced plastics, but instead of the UD prepregs 300, a sheet obtained by impregnating a woven fabric formed of carbon fibers with a resin (which is generally called a fabric prepreg, and hence is hereinafter referred to as "fabric prepreg") may be used. In this case, it is only necessary that a plurality of fabric prepregs, which overlap with each other in the same manner as in the UD prepregs 300, be placed in each of the coupling portion molding regions 112a and 112b under a state of being wound on the outer peripheral surface of the elastic bush 50 by at least a half circumference. As a result, the continuous carbon fibers in the fabric prepregs are arranged along the circumferential direction of the insertion hole 21 in plan view as seen from the direction of the center axis L2 of the insertion hole 21.

With the suspension arm 1 according to this embodiment described above, the two coupling portions 20 are each made of the continuous fiber reinforced plastics A in which the continuous fibers are oriented along the circumferential direction of the insertion hole 21 over the region on the distal end side of the suspension arm 1, which continuously extends by at least a half circumference around the center axis of the insertion hole 21, the region including the position crossing the flat plane that is orthogonal to the straight line connecting the center points of the insertion holes 21 and passes through the center point of the insertion hole 21. Thus, the weakest portion having lowest strength with respect to a tensile load is made of the continuous fiber reinforced plastics A, and hence the weight can be reduced while the required strength is maintained also in the weakest portion.

Further, the cost of the continuous fiber reinforced plastics A is higher than that of the random fiber reinforced plastics B. Therefore, with the suspension arm 1 in which the continuous fiber reinforced plastics A is formed into an arc shape around the center axis of the insertion hole 21 as illustrated in FIG. 2A and FIG. 2B, the required strength can be maintained with respect to a tensile load at low cost.

Further, with the suspension arm 1 in which the region made of the continuous fiber reinforced plastics A is formed into an annular shape making a round of the center axis of the insertion hole 21 as illustrated in FIG. 2C, a joint surface on which the continuous fiber reinforced plastics A and the random fiber reinforced plastics B are joined to each other is not formed in the circumferential direction around the center axis of the insertion hole 21, and hence durability can be improved. Further, moldability can be improved.

Further, as illustrated in FIG. 3, with the suspension arm 1 in which a part of the thickness in the radial direction of the coupling portion 20 (radial direction of the insertion hole 21) is made of the continuous fiber reinforced plastics A, and the remaining part of the thickness in the radial direction is made of the random fiber reinforced plastics B, through setting of the thickness of the continuous fiber reinforced plastics A in accordance with the required strength, the required strength can be maintained with respect to a tensile load at low cost.

Further, the suspension arm 1 can be formed in a seamless manner, and hence durability is high even with respect to input of cyclic fatigue.

In the above, the suspension arm for a vehicle of this embodiment has been described, but the present invention is not limited to the above-mentioned embodiment, and various changes are possible within the range not departing from the object of the present invention.

What is claimed is:

1. A suspension arm for a vehicle, comprising:
    an arm portion formed into a solid bar shape; and
    two coupling portions each having an annular shape, the two coupling portions being arranged at both ends of the arm portion and each having an insertion hole in which a coupling member to be coupled to one of a vehicle body member and a wheel support member is inserted,
    the suspension arm being integrally made of a fiber reinforced plastics in entirety,
    the fiber reinforced plastics comprising a continuous fiber reinforced plastics in which continuous fibers adhere to each other with a resin and a random fiber reinforced plastics in which discontinuous fibers adhere to each other with a resin in random orientations,
    the arm portion being made of the random fiber reinforced plastics,
    the two coupling portions each being made of the continuous fiber reinforced plastics in which the continuous fibers are oriented along a circumferential direction of the insertion hole over a region on a distal end side of the suspension arm, which continuously extends by at least a half circumference around a center axis of the insertion hole, the region including a position crossing a flat plane that is orthogonal to a straight line connecting center points of the insertion holes and passes through the center point of the insertion hole.

2. A suspension arm for a vehicle according to claim 1, wherein at least one of the two coupling portions includes:
    the region made of the continuous fiber reinforced plastics, the region being formed into an arc shape around the center axis of the insertion hole; and
    a region on the arm portion side with respect to the region formed into the arc shape, the region on the arm portion side being made of the random fiber reinforced plastics.

3. A suspension arm for a vehicle according to claim 1, wherein at least one of the two coupling portions includes the region made of the continuous fiber reinforced plastics, the region being formed into an annular shape making a round of the center axis of the insertion hole.

4. A suspension arm for a vehicle according to claim 1, wherein the at least one of the two coupling portions is made of the continuous fiber reinforced plastics in a part of a thickness in a radial direction and is made of the random fiber reinforced plastics in a remaining part of the thickness in the radial direction.

5. A suspension arm for a vehicle according to claim 1, wherein the continuous fibers and the discontinuous fibers comprise carbon fibers.

* * * * *